United States Patent [19]
Grove

[11] 3,760,909
[45] Sept. 25, 1973

[54] ELECTROMAGNET FOR BRAKES AND CLUTCHES

[76] Inventor: Leroy K. Grove, 512 S. Merrifield Ave., Mishawaka, Ind. 46544

[22] Filed: Feb. 28, 1972

[21] Appl. No.: 229,759

[52] U.S. Cl. .................................. 188/138, 310/77
[51] Int. Cl. ....................... F16d 65/34, H02k 7/102
[58] Field of Search ................ 188/138, 171, 218 R, 188/218 XL, 251 A, 251 R, 163, 164; 310/77

[56] References Cited
UNITED STATES PATENTS

| | | | |
|---|---|---|---|
| 2,288,438 | 6/1942 | Dach | 188/218 R |
| 2,481,028 | 9/1949 | Lear | 188/218 XL X |
| 3,134,463 | 5/1964 | Birge | 188/138 |
| 3,668,445 | 6/1972 | Grove | 188/138 X |

*Primary Examiner*—Duane A. Reger
*Attorney*—Marmaduke A. Hobbs et al.

[57] ABSTRACT

An electromagnet for brakes and clutches having outer and inner poles and an electrical coil for magnetizing the poles for engaging the armature of the brake or clutch, in which the armature contact face of the poles is provided with alternate lands and recesses. The lands and recesses may be in a variety of different shapes, including those with straight and circular configurations. The lands are preferably crowned and the recesses may be filled with an abrasive-impregnated material, such as an epoxy, to increase the frictional characteristics of the magnet.

15 Claims, 5 Drawing Figures

ELECTROMAGNET FOR BRAKES AND CLUTCHES

In a conventional, hydraulically actuated brake, a pair of brake shoes are pivotally secured to a stationary brake back-up plate and are moved into contact with a brake drum by the actuation of a piston in a hydraulic brake cylinder responsive to fluid pressure applied to the brake cylinder. In an electrically actuated system, the brake shoes are moved by means responsive to an electrical current, such a system being exemplified by the U.S. Pat. to William F. Penrose, No. 2,273,065. In these electrically operative systems a lever arm is pivotally secured to the brake back-up plate such that rotation of the lever arm causes movement of the brake shoes into contact with the brake drum. At the end of the lever arm is secured an electromagnet which is usually maintained in sliding contact with an armature plate which is secured to and moves with the brake drum. In a one piece cast iron drum and hub assembly, the face of the drum may serve as the armature plate. When the electromagnet is energized, it is magnetically attracted to the rotating armature plate, and, due to the friction between these two metal parts so attracted, a force is imposed on the magnet tending to move it in the direction of movement of the armature. This force is in turn transmitted by the lever arm to actuate the brake shoes into braking engagement with a brake drum.

It has been the practice to provide an electromagnet construction in which the metal pole faces of the electromagnet would, when energized, be forcibly held in direct metal-to-metal contact with the rotating armature with sufficient magnetic attraction to provide the necessary friction to actuate the brake shoes to the degree required for braking purposes. The surface of the frictional face of the electromagnet between the metal pole faces usually consists of a frictional material or an abrasive-filled epoxy to improve the frictional characteristics. The face of the electromagnet and the face of the armature are made as smooth and flat as possible to provide maximum magnetic attraction and frictional contact area. In the operation of this conventional electric brake, particularly at higher speeds and longer braking engagements, the metal-to-metal friction produces extreme heat at the metal face of the magnet. The armature, because of its much larger area, easily dissipates the frictional heat generated at its surface. When the frictional heat generated at any point on the face of the magnet sufficiently exceeds the capability of the magnet housing to absorb and dissipate the heat, the metal at this point, usually a high spot, softens, smears across the face of the magnet, and absorbs or picks up loose particles of metal from the armature. The smearing and metal pickup raise these smeared areas above the rest of the magnet face to focus the friction and heat on these areas to increase and sustain this smearing and metal pickup. Not unlike friction welding, extremely hard, high spots of fused metal are formed on localized areas of the magnet face which, after cooling sufficiently to resolidify, will gouge, score, and tear the face of the armature. Once started, this destructive action proceeds rapidly, and the magnet loses its power to actuate the brake. It is well recognized in the vehicular brake industry that the reliability of electric brake systems currently used on trailers and mobile homes is severely restricted by the performance of metal-to-metal friction electromagnets which actuate the brake.

It is a principal object of this invention to greatly improve both the performance and the reliability of the electromagnet by providing a magnet face configuration which enables the friction face of the magnet to quickly achieve and then maintain a full flat face mating contact with the armature. This desirable magnet-armature relationship provides maximum magnetic attraction, maximum frictional brake torque, and equalized heat distribution over the entire face of the magnet.

Another object of the invention is to provide an improved and highly effective magnet face surface configuration in a new and uniquely simple manner. In my novel electromagnet the metal face is not flat and smooth, as is current practice, but rather contains intermittent flat and recessed portions to provide a multiplicity of compartmentalized, frictional surfaces. The many lands and recesses are so located on the friction face of the magnet that the path of the rotating armature intermittently crosses a land and then a recess one after another. The relative size and shape of the lands and recesses can be controlled and varied to provide the desired magnet performance characteristics.

The full flat faced magnet to armature mating contact can only be achieved if the initial high spots of the magnet are quickly worn away without starting the localized overheating, smearing and metal pickup destructive cycle. Proper crowning of the frictional lands a few thousandths of an inch above the normal flat wear surface induces such rapid initial wear that the magnet can obtain full flat mating contact with the armature during the initial braking applications without producing localized overheating.

The desired magnet to armature relationship can only be maintained after the initial wear-in if the entire face of the magnet wears evenly at the same wear rate; otherwise high spots develop on the face of the magnet. The brake electromagnet will normally wear faster on the narrow outer pole ring than on the large solid center core. The relatively narrow land and recess configuration on the entire magnet face breaks up the solid wear surface into many compartmentalized wear surfaces which wear at the same rate.

As stated before, in the conventional magnet should any localized overheated metal smear across the face of the magnet, the metal pickup and armature scoring will self-sustain the destructive action. In this invention, should localized overheating occur on the magnet face, the nearest recess will instantly trap and retain the overheated metal to prevent it from smearing across the magnet face. The control that this land—recess friction face configuration exercises over the performance and wear characteristics of the magnet plus the almost infinite number of variations of land—recess configuration available make it possible to design a magnet face configuration which will impart to the magnet the specific performance characteristics required for a particular application or environment. Thus, the magnet can produce light, moderate, or maximum frictional torque. The wear characteristics can be controlled to make the magnet compatible with either a rough, abrasive, smooth, or an anti-scoring armature as disclosed in my U. S. Pat. application Ser. No. 188,346.

Should even greater frictional torque be required the recesses may be filled with an abrasive-loaded epoxy or other suitable abrasive compound without sacrificing the other desirable performance characteristics. It is economically desirable, however, to choose a pattern which is least expensive to produce for any particular magnet construction. Thus, the land—recess pattern can be produced by machining, broaching, coining, grinding, casting to shape or as shown herein, formed as an integral part of a sintered metal housing at no additional cost.

The present invention will be more fully understood from the detailed description of one specific embodiment of the invention, with reference to the accompanying drawings, wherein.

Figure 1:
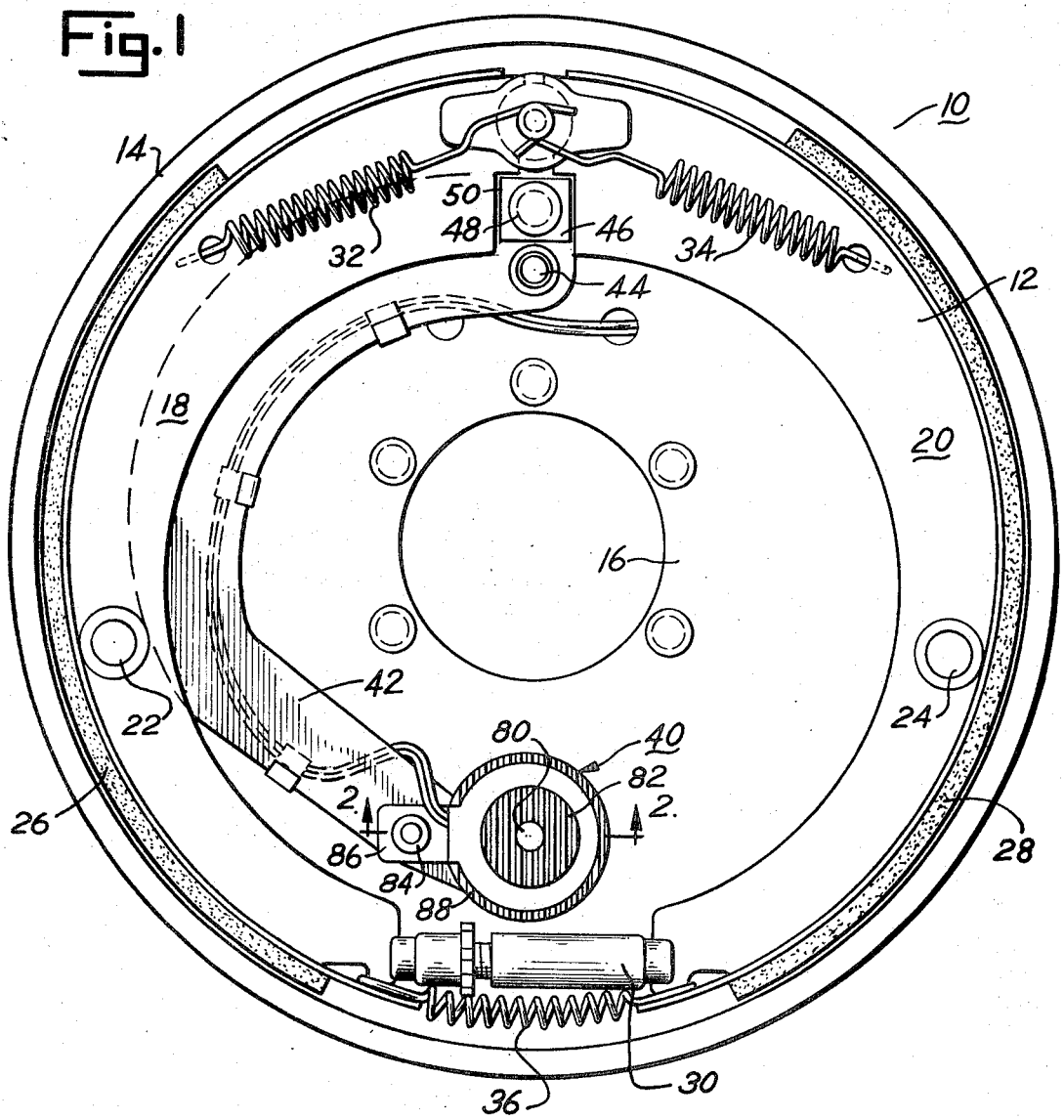
FIG. 1 is an elevational view of a backing plate, brake shoes and operating mechanism of the type which may be used in combination with my new electromagnet and with a drum shown in transverse cross section.
Figure 2:
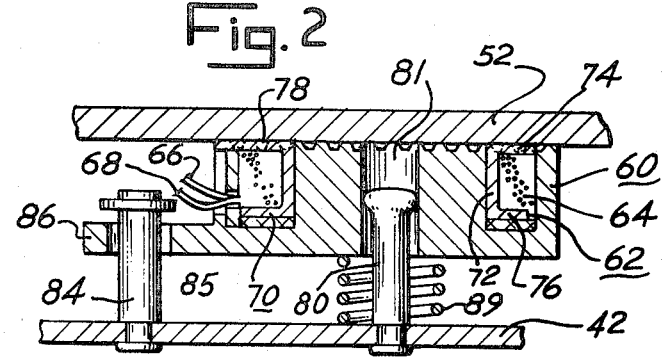
FIG. 2 is an enlarged, fragmentary partial cross-sectional and elevational view of the electromagnet shown in FIG. 1, the section being taken on line 2—2 of the latter figure, together with a portion of the brake drum.
Figure 3:
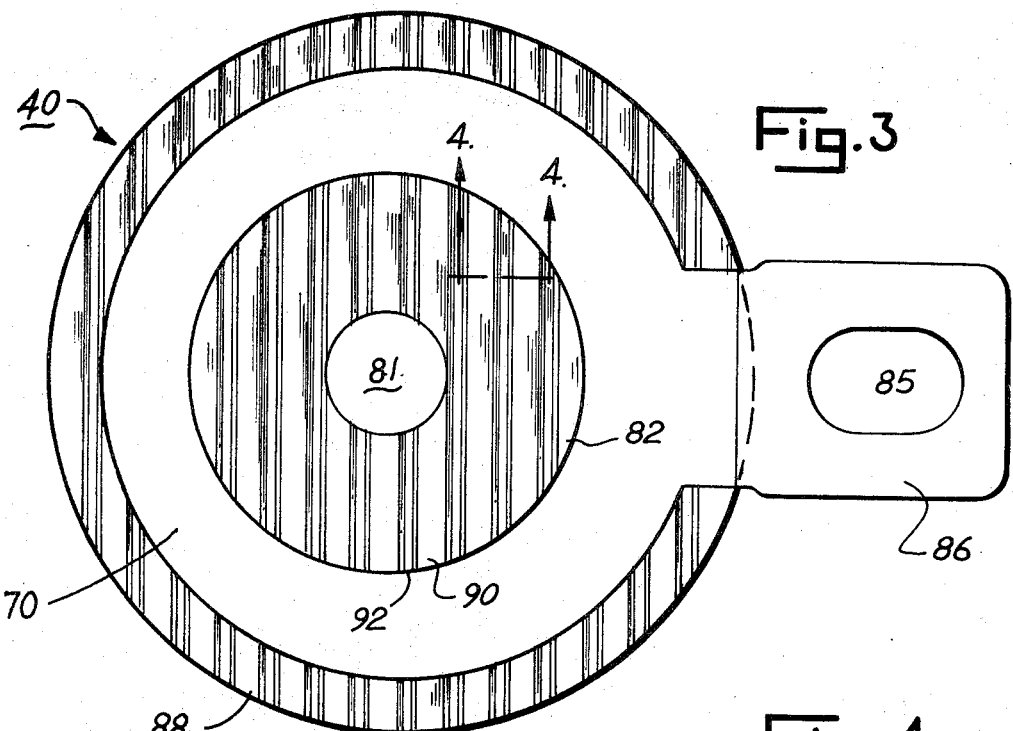
FIG. 3 is an enlarged plan view of the electromagnet shown in FIGS. 1 and 2.

Referring more specifically to the drawings and FIG. 1 in particular, numeral 10 indicates generally the brake assembly, including a brake operating mechanism 12 and a brake drum 14 which is attached to and normally forms a part of the wheel structure of the vehicle in which the brake is used. The brake assembly includes a backing plate 16 on which brake shoes 18 and 20 are pivotally mounted and movably secured thereto or restrained by spring-loaded retaining pin assemblies 22 and 24, respectively. The brake shoes contain friction material 26 and 28 bonded to the external surface of the brake shoes, and engage the internal surface of drum 14 when the brake is applied. An adjustment screw 30 interconnects the brake shoes which are yieldably retained in their retracted position from the brake drum by springs 32, 34 and 36.

The brake actuating mechanism for applying brake shoes 18 and 20 into braking engagement with the drum consists of an electromagnet 40, embodying the present invention, mounted on a lever 42 which in turn is pivotally connected to a pin 44 secured to backing plate 16. Lever 42 swings on pin 44 and is curved in an off-set manner to pass around the drum axis and to position the electromagnet at a point 180 degrees from pin 44. Arm 42 includes an extension or short arm 46 carrying a pin 48 on a swivel block 50, which bears against the adjacent ends of the brake shoes. The magnet is operated in conjunction with an armature 52 formed integrally with and connected directly to brake drum 14 on a plane parallel with backing plate 16. The magnet 40 faces the armature and is adapted to frictionally engage the face thereof when energized.

With the armature and the brake drum 14 rotating in a counterclockwise direction, electromagnet 40, when energized, will be moved to the right, as viewed in FIG. 1, thereby moving swivel block 50 to the left so that it pushes against the end of brake shoe 18 to move the shoe outwardly into braking engagement with the internal surface of drum 14. The engagement of the brake shoe 18 with the drum in turn develops a self-energizing force on shoe 18, which is transmitted through screw 30 to brake shoe 20 to cause the latter shoe to move into braking engagement with the internal surface of drum 14. With the rotation of the armature plate 52 and brake drum in the clockwise direction, the action just described is performed in reverse with the electromagnet moving to the left to cause swivel block 50 to engage the adjacent end of the brake shoe 20 which in turn, through screw 30, actuates brake shoe 18. When the electromagnet is released or de-energized, the two springs 32 and 34 disengage the brake shoes from the drum, returning them and the electromagnet to the position illustrated in FIG. 1.

The electromagnet 40 which embodies my invention consists of a metal housing 60 carrying the magnetic flux and a bobbin and coil assembly 62 for producing the magnetic field. The metal housing may be constructed of powdered iron formed and compressed to high density in its finished size and shape and sintered at high temperatures to impart its structural strength, and is produced on automated machinery, ready for assembly without further machining. The bobbin and coil assembly consists of the magnet wire 64 and lead wires 66 and 68 assembled on bobbin 70. This bobbin, as illustrated in FIGS. 2 through 5, and disclosed in and covered by my copending application Ser. No. 197,329 filed Nov. 10, 1971, has a cylindrical center 72 and flanges 74 and 76, and is non-magnetic and electrically non-conductive, suitable for high temperature environment, and abrasive, to serve as a frictional face. One example of a suitable material for the bobbin is a glass filled polycarbonate plastic such as General Electric Company's Lexan, although other materials such as polyurethane and natural or synthetic rubber based friction material may be used. This one piece molded bobbin is an electrically insulating coil form for the magnet wire, and the upper bobbin flange 74 is designed to serve as a part of the wear and friction face 78 of the magnet.

The magnet 40 may be secured to the arm by any suitable attachment means, the means shown in the drawings consisting of a pin 80 extending into a center opening 81 in the center pole 82 of the magnet, and a second pin 84 extending through a hole 85 in a lug 86 connected to the base of the outer pole 88 of the housing. A spring 89 urges the magnet toward the face of the armature. Other suitable attachment means may be used for mounting the magnet on arm 42, such as the attachment means illustrated and claimed in my patent application Ser. No. 197,308 filed Nov. 10, 1971.

In the embodiment of the invention illustrated in FIGS. 1 through 4, the face of the magnet which contacts the armature is provided with alternate lands and grooves throughout both the outer and inner poles. These alternately positioned flat lands 90 and recessed portions 92 provide a large number of compartmentalized frictional surfaces intersecting the direction of the surface rotation of the armature, thus causing the surface of the armature to cross intermittently the lands and recesses. The lands and recesses 90 and 92 are straight on both the inner and outer poles, and for convenience of manufacturing, the lands and recesses of the inner pole are in alignment with the lands and recesses of the outer pole at the lateral sides of the magnet face. The lands are preferably crowned, as illustrated at numeral 94 in FIG. 4, a few thousandths of an inch above the normal flat wear surface, to facilitate and induce rapid initial wear of the magnet thereby producing a full and flat mating contact with the armature during the initial breaking in applications, without producing localized overheating.

Figure 4:
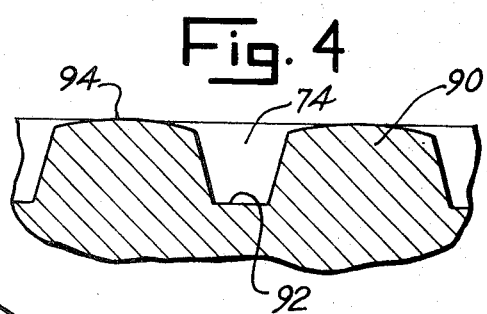
FIG. 4 is an enlarged fragmentary cross-sectional view of the electromagnet shown in the preceding figures, the section being taken on line 4—4 of FIG. 3.

The outer contact surface of flange 74 of bobbin 70 is substantially on a plane with the outer surface of the land, as best seen in the enlarged fragmentary section of FIG. 4. This permits the abrasive characteristic of the frictional face of flange 74 to function effectively when the magnet is energized and said surface is seated firmly on the armature face.

Figure 5:
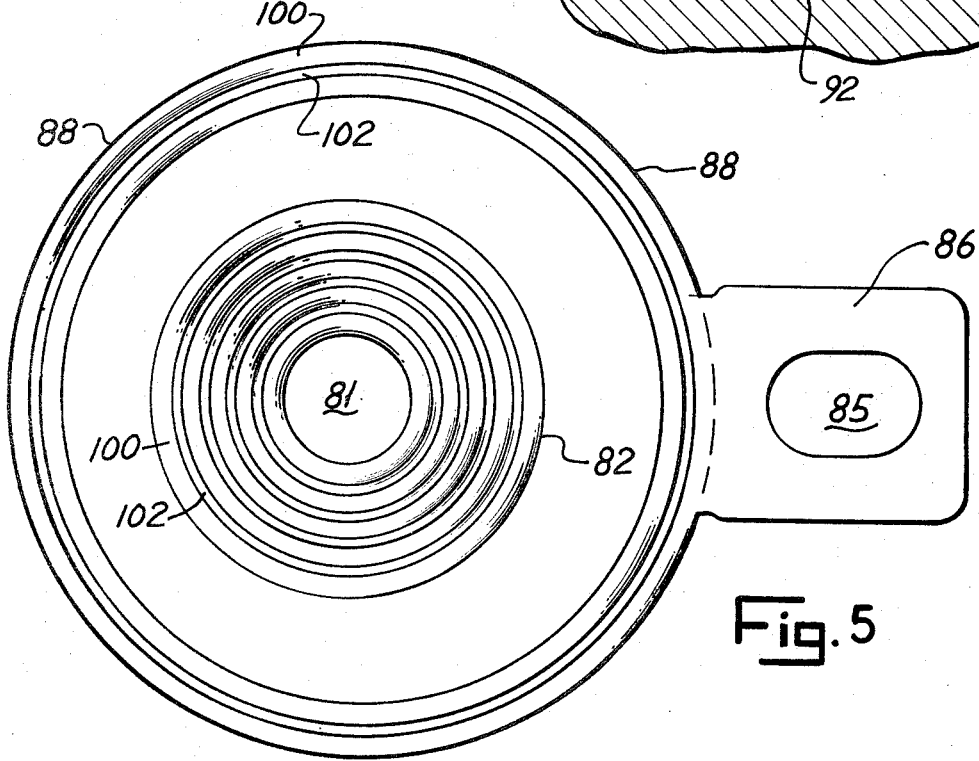
FIG. 5 is an enlarged plan view of a modified form of my electromagnet, showing a face configuration different from the embodiment of the invention shown in the preceding figures.

In FIG. 5 the lands and recesses 100 and 102 are in a circular form substantially concentric with the center of the magnet and with the concentricity of the outer and inner poles 82 and 88, respectively. The circular lands shown in FIG. 5 may be crowned in the manner illustrated in FIG. 4, and the frictional surface of bobbin flange 74 is likewise substantially on a plane with the outer surface of lands 100. One of the advantages of the embodiment of the invention illustrated in FIG. 5 is the fact that at least two portions of each ring will always be in a substantially right angle position with respect to the direction of rotation between the magnet face and the armature, thus providing an effective action of the lands and recesses even though the magnet may vary somewhat in position with respect to the direction of rotation during the operation of the brake. Various other configurations of lands and recesses are possible, such as intersecting recesses or grooves which, in effect, produce numerous square or diamond shaped lands separated by the recesses. The relative size and shape of the lands and recesses can be varied to provide the desired magnetic performance characteristics for any particular application or installation. The conventional magnet and drum are normally provided with smooth surfaces to obtain maximum magnetic attraction and friction between the contacting areas. This, however, has produced over-heating of the magnet, which causes the metal, particularly on the center pole, to soften at high points and smear across the face of the magnet, thus producing areas protruding beyond the rest of the magnet face which focus the friction and heat on the areas and sustain the smearing and metal pickup. The present magnet, having the alternate lands and recesses in various configurations, minimizes this condition in that any tendency of the metal face of the magnet to smear is interrupted by the recesses so that the smearing does not produce the high points. The lands maintain a constant face-to-face contact with the armature, thereby prolonging the optimum effectiveness of the magnet over extended periods of time and use. The smeared metal and any particles of material which might otherwise adhere to the face of the conventional magnet are entrapped in the recesses where they will not produce any adverse effect on the face of the magnet.

In order to improve the friction characteristics of the magnet, the recesses may be filled with an abrasive-containing material. The material, such as an epoxy, in the grooves, however, does not prevent the grooves from minimizing the adverse smearing effect of the metal on the surface of the magnet which normally occurs in conventional magnets. The epoxy will retain the smeared metal and particles and prevent them from building up on the contact surface of the magnet or damaging the armature. If desired, some of the grooves may be filled with an epoxy while others remain open, thus providing a combination of grooves and abrasive surfaces to satisfy special braking or other operational requirements. In some brakes or clutches it may be advantageous or economical to use lands and recesses on one pole surface instead of both.

While only two embodiments of the magnet and several modifications thereof have been described in detail herein, various other modifications and changes may be made without departing from the scope of the invention.

I claim:

1. An electromagnet for brakes and clutches having an armature, comprising an outer pole and an inner pole, an electrical coil for magnetizing said poles, said poles having faces for engaging the armature of the brake or clutch, and spaced armature contact surfaces consisting of a plurality of alternate lands with recesses therebetween in said pole faces.

2. An electromagnet for brakes and clutches as defined in claim 1 in which said alternate lands and recesses of said pole faces are straight and are adapted to be positioned transverse to the direction of rotation of the armature surface of the brake or clutch at said pole faces.

3. An electromagnet for brakes and clutches as defined in claim 1 in which said alternate lands and recesses in said pole faces are circular.

4. An electromagnet for brakes and clutches as defined in claim 3 in which said outer and inner poles are circular and said lands and recesses in the pole faces are substantially concentric with the two poles.

5. An electromagnet for brakes and clutches as defined in claim 1 in which said lands are crowned.

6. An electromagnet for brakes and clutches as defined in claim 1 in which an epoxy containing an abrasive material substantially fills at least some of said recesses.

7. An electromagnet for brakes and clutches comprising two poles, an electrical coil for magnetizing said poles, each of said poles having a face for engaging an armature of a brake or clutch, and spaced armature contact surfaces consisting of alternate lands with recesses therebetween in the face of at least one of said poles.

8. An electromagnet for brakes and clutches as defined in claim 7 in which said alternate lands and recesses of said pole face are straight and are adapted to be positioned transverse to the direction of rotation of the armature surface of the brake or clutch at the respective pole.

9. An electromagnet for brakes and clutches as defined in claim 7 in which said alternate lands and recesses in said pole face are circular.

10. An electromagnet for brakes and clutches as defined in claim 9 in which said outer and inner poles are circular and said lands and recesses in the pole faces are substantially concentric with the two poles.

11. An electromagnet for brakes and clutches as defined in claim 7 in which said lands are crowned.

12. An electromagnet for brakes and clutches as defined in claim 7 in which an abrasive-containing material substantially fills at least some of said recesses.

13. An electromagnet for brakes and clutches as defined in claim 12 in which said abrasive-containing material is an epoxy.

14. An electromagnet for brakes and clutches as defined in claim 7 in which said coil is wound on a bobbin having a flange with a friction surface on a plane substantially the same as the outer surface of said lands.

15. An electromagnet for brakes and clutches as defined in claim 11 in which said coil is wound on a bobbin having a flange with a friction surface on a plane substantially the same as the outer surface of said lands.

* * * * *